United States Patent [19]

Idleman et al.

[11] Patent Number: 4,868,734
[45] Date of Patent: Sep. 19, 1989

[54] VARIABLE RATE IMPROVEMENT OF DISC CACHE SUBSYSTEM

[75] Inventors: Thomas E. Idleman, Santa Clara; Jesse I. Stamness, Sunnyvale, both of Calif.

[73] Assignee: Unisys Corp., Detroit, Mich.

[21] Appl. No.: 132,690

[22] Filed: Dec. 14, 1987

Related U.S. Application Data

[60] Continuation of Ser. No. 609,063, Apr. 30, 1984, abandoned, which is a division of Ser. No. 519,213, Aug. 2, 1983, which is a continuation of Ser. No. 236,453, Feb. 2, 1981, abandoned, which is a continuation of Ser. No. 45,361, Jun. 4, 1979, abandoned.

[51] Int. Cl.[4] .................... G06F 12/08; G06F 13/10
[52] U.S. Cl. .................... 364/200; 364/43 A; 364/43 C; 364/243.4; 364/243.41; 364/243.43
[58] Field of Search ... 364/200 MS File, 900 MS File

[56] References Cited

U.S. PATENT DOCUMENTS

| | | | |
|---|---|---|---|
| 3,422,401 | 1/1969 | Lucking | 364/200 |
| 3,569,938 | 3/1971 | Eden | 364/200 |
| 3,647,348 | 3/1972 | Smith et al. | 364/200 |
| 3,737,881 | 6/1973 | Cordi et al. | 364/900 |
| 3,761,883 | 9/1973 | Alvarez et al. | 364/200 |
| 3,949,369 | 4/1976 | Churchill | 364/200 |
| 3,949,369 | 4/1976 | Phillipchurchill | 364/200 |
| 3,967,247 | 6/1976 | Andersen | 364/200 |
| 4,020,466 | 4/1977 | Cordi et al. | 364/200 |
| 4,070,706 | 1/1978 | Scheuneman | 364/200 |
| 4,073,005 | 2/1978 | Parkin | 364/200 |
| 4,075,686 | 2/1978 | Calle et al. | 364/200 |
| 4,078,254 | 3/1978 | Beausoleil et al. | 364/900 |
| 4,084,231 | 4/1978 | Capozzi et al. | 364/200 |
| 4,133,030 | 1/1979 | Huettner | 364/200 |
| 4,179,737 | 12/1979 | Kim | 364/200 |
| 4,186,438 | 1/1980 | Benson et al. | 364/200 |
| 4,215,400 | 7/1980 | Denko | 364/200 |
| 4,399,503 | 8/1983 | Hawley | 364/200 |

OTHER PUBLICATIONS

Article, "Memory Offers Cache Memory for Disc Devices", Electronic News, May 1, 1978.
Article, "Microprocessor-Controlled CCDs Maximize Disc Drive Performace", Electronic of America, May 2, 1978.
Article, "Memorex Maximizes Disc Drive Performance with Microprocessor-Controlled CCDs", Memorex News, Apr. 25, 1978.
IBM Technical Disclosure Bulletin, vol. 19, #2, Jul. 1976, pp. 597-598.

*Primary Examiner*—David Y. Eng
*Attorney, Agent, or Firm*—Nathan Cass

[57] ABSTRACT

An improved input/output subsystem allowing data transfers between the input/output subsystem and an input/output controller along a subsystem input/output bus to occur at a data transfer rate established by the transfer rate of the processor bus connected between the input/output controller and the central processing unit. Data is transferred from an electronic memory within the input/output subsystem to data buffers within the input/output controller via a direct memory access.

8 Claims, 9 Drawing Sheets

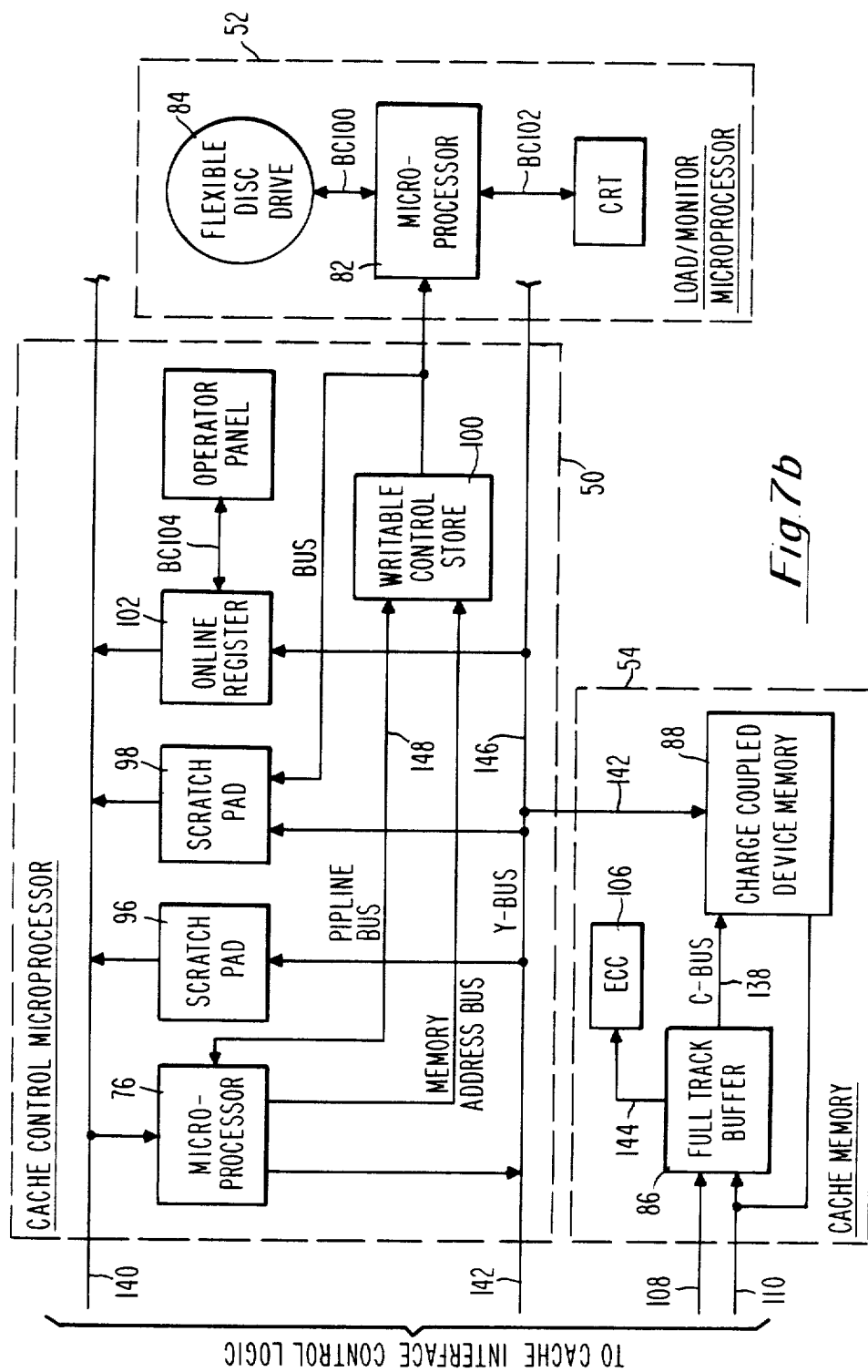

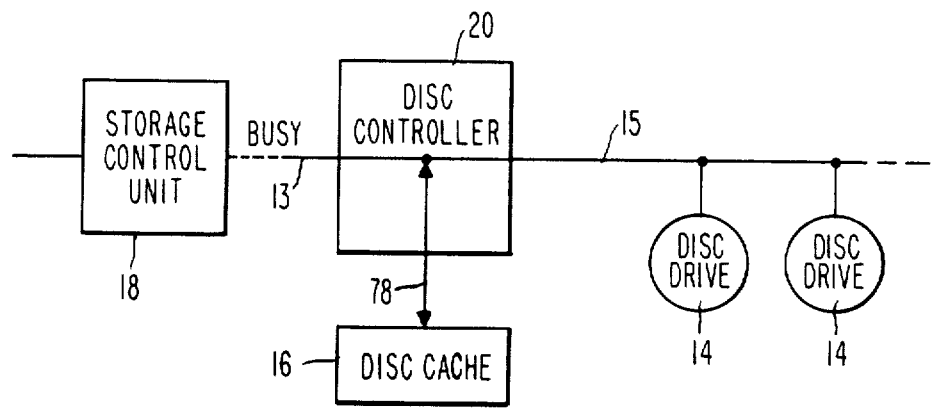
_Fig. 11_
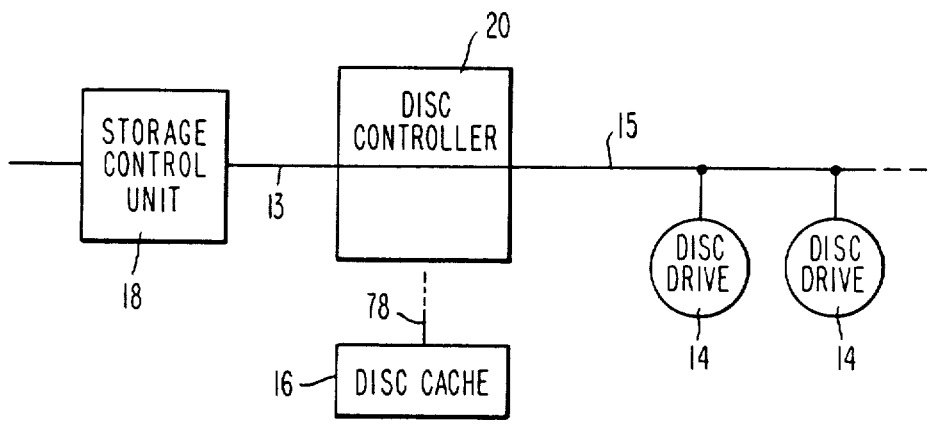
_Fig. 12_

VARIABLE RATE IMPROVEMENT OF DISC CACHE SUBSYSTEM

This application is a continuation of application Ser. No. 609,063, filed Apr. 30, 1984, abandoned, which is a division of application Ser. No. 519,213, filed Aug. 2, 1983, which is a continuation of application Ser. No. 236,453, filed Feb. 2, 1981, abandoned, which is a continuation of application Ser. No. 45,361, filed June 4, 1979, abandoned.

BACKGROUND OF THE INVENTION

1. Field of the Invention

The invention relates to the field of rotating magnetic computer disc memories. The invention proposes an improved subsystem architecture wherein a high-speed semiconductor memory of small size permits more rapid retrieval of information that is frequently accessed by the central processing unit.

2. Description of the Prior Art

Since the introduction of the System 360, a standard architecture has been established for the attachment of input/output devices to IBM central processing units. The central processing unit communicates via a "channel" with peripheral input/output devices. The channel interface permits connection of a storage control unit (SCU) which interprets the commands from the central processing unit and directs writing of information to or retrieval of information from disc devices. In practice, the SCU attaches to a disc controller which in turn can accommodate a plurality of rotating magnetic disc storage drives. A storage control unit of the type hereinabove discussed is the Memorex 3674 storage control unit (described in Memorex Publication 3674.21-00 entitled "3674 Storage Control Unit Theory of Operation"). A disc controller of the type hereinabove discussed is the Memorex 3673 disc controller (described in Memorex Publication 3673.21-02 entitled "3673/75/70 Disc Storage Subsystem Theory of Operation"). Disc storage devices of the type hereinabove discussed are the Memorex 3670 and 3675 disc drive modules (described in Memorex Publication 3673.21-02 entitled 3673/75/70 Disc Storage Subsystem Theory of Operation. The interconnection of the channel to the SCU disc controller and disc drive modules is described in Memorex Publication 3673/75/70 Disc Storage Subsystem Theory of Operations (Memorex Publication 3673.21-02).

It is also known in the prior art that a disc controller of the type exemplified by the Memorex 3673 disc controller with a plurality of disc drive modules attached hereto may be attached to a plurality of storage control units via a feature known as the string switch. The string switch feature is an array of hardware and microcode defining an intelligent interface which allows a plurality of storage control units to communicate with a single string of disc drives controlled by a 3673 type disc controller.

A request for storage of a particular piece of data or a request for retrieval of a particular piece of data is initiated by the channel. Through the storage control unit and the disc controller, the disc string will obtain access to the particular piece of information. However, a delay is involved in this process due to the mechanical and electronic configuration of the components. Particular to the mechanical configuration of the disc storage devices, magnetic read/write recording heads are rigidly affixed to a moving carriage which can access a plurality of prerecorded tracks on the disc spindle. A request for information often necessitates movement of the carriage carrying the read/write magnetic transducers to the track upon which the data is stored. The time for the carriage to complete such an access can be as little as ten (10) milliseconds or as great as fifty (50) milliseconds. In addition, once a particular track has been accessed and the carriage electronically locked into place by following the servo tracking information, another delay is encountered while the disc rotates to the the proper position where the desired information is stored. Disc rotational delay or "latency" can be negligible or as great as approximately seventeen (17) milliseconds for discs rotating at 3600 RPM. On the average, latency amounts to a delay of approximately eight (8) milliseconds for discs rotating at 3600 RPM. Both the access time and latency delays can amount to significant overheads upon the performance of the central processing unit to accomplish its desired tasks. In addition, disc storage devices by their nature only transfer information to the channel via the appropriate control devices at fixed data transfer rates. The data transfer rate is a function of the bit density of information stored upon the disc storage device and the rotational speed of the discs themselves. For the Memorex 3670 and 3675 products, the data transfer rate is nominally 806,000 bytes per second; however, the channel can often permit by its own limitations transfer rates much higher than 806,000 bytes per second. That is, the disc storage device is not making complete use of the maximum speed of the channel electronics, a fact of life that systems architects have learned to live with.

It is also known in the prior art that although disc storage devices are known as direct access storage devices (DASD), meaning that they can store or retrieve any particular piece of information in approximately the same elapsed time, users very frequently do not randomly store and retrieve information in a typical computer installation. In practice, the usage of disc storage devices is often "clustered" in time about particular sets of data. What this amounts to is that particular tracks of information in a disc storage device are frequently accessed or updated to the exclusion of hundreds of millions of bytes of other information. Thus, the concept of "caching" has been explored in the prior art as a means for storing more frequently accessed information in a high-speed buffer on the probability that that information will be accessed to the exclusion of most all other information currently in residence in much larger capacity direct access storage devices.

U.S. Pat. No. 4,075,686 to Calle, et al. and U.S. Pat. No. 4,070,706 to Scheuneman both decribe system configurations utilizing a cache memory for the rapid access of priority information in order to enhance system performance. Both Calle, et al. and Scheuneman however do not specifically describe or suggest the application of a high-speed semiconductor cache memory to conventional disc string architecture. U.S. Pat. No. 3,949,369 to Churchill describes a digital computing system utilizing a high-speed cache buffer. Churchill points out that information in the cache buffer might practically be structured so that a priority system is established with respect to such information on the basis of its frequency of use. The most frequently used information would receive the highest priority and the least frequently used information would receive the lowest priority. If additional information needed to be stored within the high-speed cache memory and space was not available, the least frequently used information presently within the cache buffer would be erased. The concept of the least recently used (LRU) algorithm has been explored in the U.S. Pat. No. 3,737,881 to Corde, et al. Corde, et al, specifically addresses the requirements of application of the caching concept to "pages" of information in a high-speed magnetic bubble domain memory. "Pages" are understood in the computer industry to be predetermined blocks of a certain size dictated by the system control programming or operating system. In general, the introduction of virtual storage or virtual memory techniques as employed in the configuration of the system control programming or operating system has brought with it the concept of a high-speed storage which might be used for more rapid access of the central processing unit (CPU) to frequently used information as opposed to requiring access by the CPU to the much larger capacity direct access storage devices. A generally described paging system utilizing a high-speed cache memory in conjunction with a larger disc memory is described by U.S. Pat. No. 3,647,348 to Smith, et al. In addition, the concept of an "apparent store" is explored by U.S. Pat. No. 3,569,938 to Eden in which, again, high-speed storage is used as an intermediary buffer between the CPU and much larger main storage to enhance the performance of the CPU. However, all references as hereinabove cited specifically do not teach nor do they suggest the application of a high-speed semiconductor cache memory utilizing an LRU algorithm as might be efficiently applied to a disc string.

SUMMARY OF THE INVENTION

The invention is an adaptation of the input/output controller or storage control unit of a data processing subsystem to permit the regulation of data transfers from the subsystem input/output bus, or CTL interface in the case of IBM-compatible architecture, to the processor bus, or channel in IBM-compatible architecture, so that said data transfers take place at a rate dictated or synchronized by the processor bus. The synchronization of said data transfers occurs through a monitoring of the data buffers within the input/output controller. When said data buffers are filled, subsystem input/output bus transfers to the input/output controller are delayed. The actual method of achieving said data transfer synchronization between the subsystem input/output bus and the processor bus is to delay the out control tag on the control tag lines so that data transfer from the input/output subsystem along the subsystem input/output bus to the processor will not occur until recognition that the out control tag has gone "low". When the out control tag is recognized by the input/output subsystem as going "low", then the in control tag is able to go "high" and further data may be transferred.

The variable or synchronized data transfers as described hereinabove require the implementation of an electronic memory within the input/output subsystem so that data transfers may be made under asynchronous conditions. A direct memory access-type of transfer from a semiconductor device buffer achieves this result.

Thus, it is an object of the invention to permit data transfers from an input/output subsystem to take place from an input/output subsystem bus to a processor bus at a rate established by the processor bus.

It is an object of the invention to improve the efficiency of data transfers from an input/output subsystem to a central processing unit.

It is further an object of the invention to achieve an overall increase in data transfer rate from an input/output subsystem to a central processing unit.

BRIEF DESCRIPTION OF THE DRAWINGS OF THE DRAWINGS

FIG. 7b is a schematic representation of the cache control microprocessor, load/monitor microprocessor and cache memory.

FIG. 11 is a diagram of control mode with respect to hardware control.

FIG. 12 is a diagram of pass through mode with respect to hardware control.

DESCRIPTION OF THE PREFERRED EMBODIMENT

Figure 1:
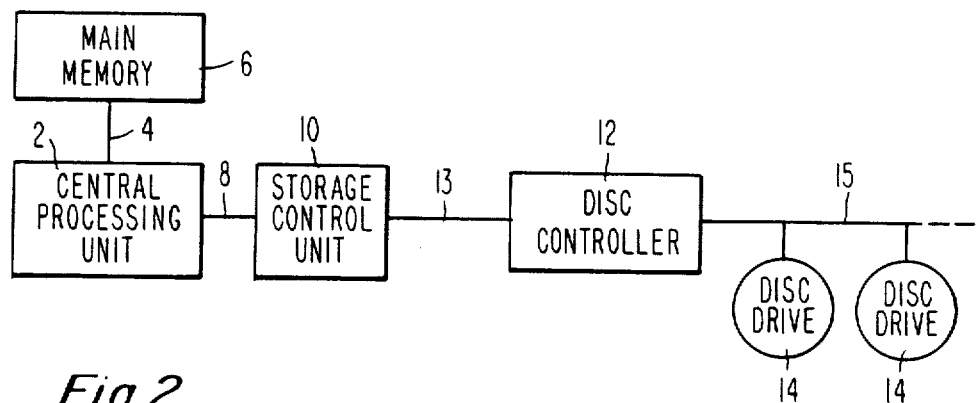
FIG. 1 is a schematic representation of a computer system of the prior art.

Contents of Description of the Preferred Embodiment

1. General
2. Disc Cache Hardware
3. Disc Cache Operational Hardware Modes
4. Disc Cache Subsystem Software
5. Storage Management
6. Tag Zero Commands
7. Variable Data Rate
   1. General By reference to FIG. 1 (prior art), it can be seen that a data processing system as is known in the art is commonly configured by having a central processing unit 2 communicate via memory bus 4 with main memory 6. Central processing unit 2 alternatively can communicate along input-output or channel bus 8 with storage control unit 10. When data is desired to be retrieved from or written to the disc storage medium, central processing unit 2 initiates a suitable command. The command is translated by storage control unit 10 into a series of commands that are specific to the type of device being addressed; in this case, storage control unit 10 would translate the commands from the central processing unit 2 into commands recognizable by disc controller 12. Storage control unit 10 communicates along system CTL interface 13 with disc controller 12. In turn, the commands from the storage control unit 10 are further interpreted and executed by disc controller 12 so that particular information may be written to or retrieved from disc drive(s) 14 via disc drive interface 15. Definitions of the prior art computer architecture including hardware interfaces and data and control line definitions can be found in the references cited in the Description of the Prior Art above.

Figure 2:
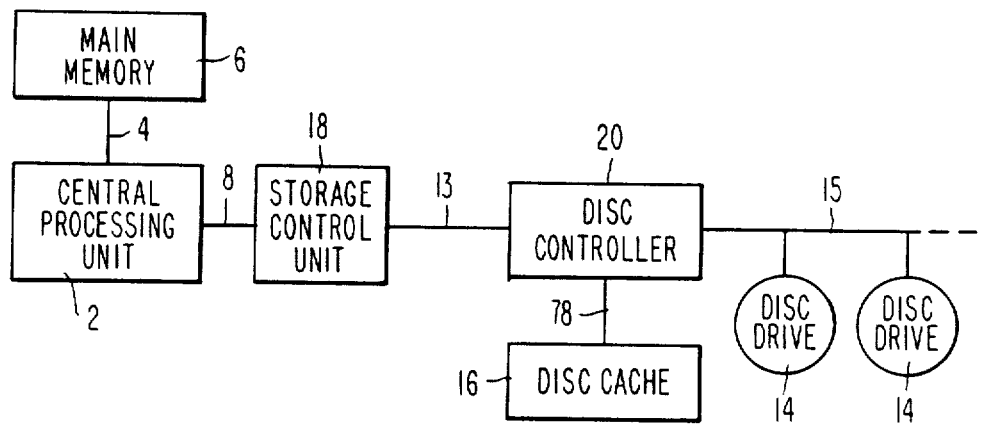
FIG. 2 is a schematic representation of a computer system employing a disc cache subsystem.

By reference to FIG. 2, it can be seen that the disc cache subsystem of the present invention is similar to the subsystem of the prior art as shown in FIG. 1. However, disc cache 16 is attached in the component hierarchy to disc controller 20 via cache CTL interface 78. In fact, disc cache 16 is actually located in front of the drive controller logic (reference 62 of FIG. 6) and disc drive 14. The disc cache 16 represents a level of memory hierarchy between the slower type storage as exemplified by typical disc systems and the faster type of storage as exemplified by main memory 6. Disc cache 16 contains internal intelligence which is utilized to manipulate data modules which are shared by the attached disc controller 20 and the string of attached disc drives 14. As used herein, a data module is a generic term for a fixed block or unit of data of some convenient dimensions.

When communicating with the disc controller 2 and disc drives 14, the disc cache 16 performs input/output operations at a speed limited to the rotational speed of disc drives 14. However, input/output operations between the storage control unit 18 and the disc cache 16 can be performed at a much higher transfer rate (decreased "wait" or "latency") than would otherwise be possible with the configuration and architecture of the prior art, which is more fully explained in the variable data rate section hereinbelow.

Figure 5:
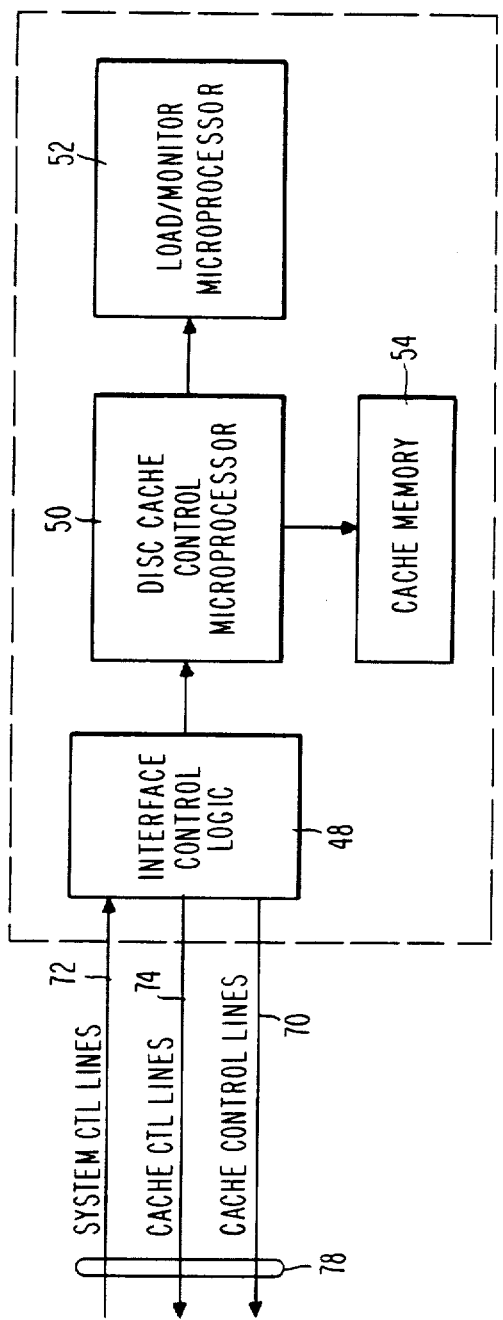
FIG. 5 is a schematic representation of the major hardware components of the disc cache.

In the subsystem of FIG. 2 which contains disc cache 16 adapted to be connected via CTL interface 78 to disc controller 20 and the string of disc drives 14, the operation is generally as follows:

For a data retrieval operation, CPU 2 makes an input/output request for a certain data module or modules residing on disc drives 14 through channel bus 8 to the storage control unit 18. The storage control unit 18 translates the request of CPU 2 into a set of commands acceptable by the disc cache 16. Referring to FIG. 5, if the requested data module is present in cache memory 54 residing within disc cache 16, it is transferred to the storage control unit 18 via system CTL interface 13 and cache CTL interface 78. If the data module requested is not present in cache memory 54, the disc cache 16 will retrieve via cache CTL interface 78 and bus 15 the required data module from disc drives 14 through disc controller 20 and store it within cache storage 54 of disc cache 16. The required data module is then transferred to the storage control unit 18 from disc cache memory 54 residing within disc cache 16 (Note: The ordering of disc cache operations may vary with the particular embodiment of the invention, and said ordering is clearly microprogram dependent).

If the central processing unit 2 desires to update information to the storage medium (i.e., a "write" type of request) it is possible for the storage or updating of such information to occur either directly in disc drives 14 through disc controller 20 or to update or write said information directly to disc cache memory 54 of disc cache 16 (Again, ordering of disc cache subsystem operations is microprogram dependent). If said information is written directly to disc cache memory 54, it would normally later be transferred to disc drives 14 for permanent storage.

Figure 4:
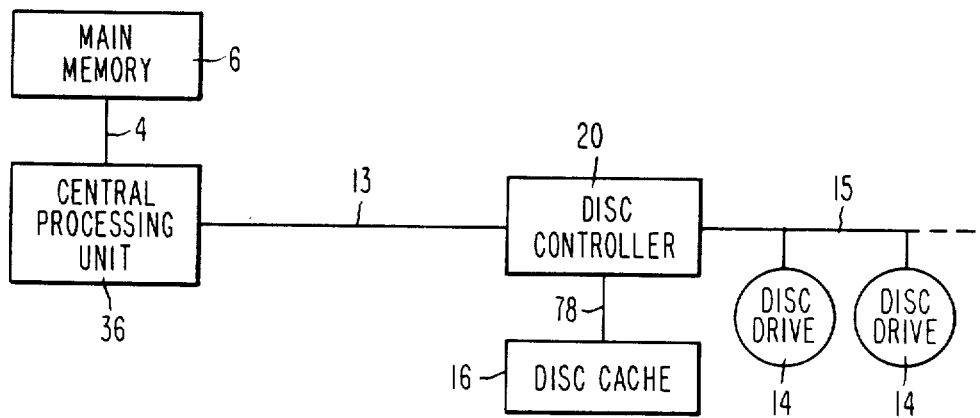
FIG. 4 is a schematic representation of an alternative embodiment of the disc cache as applied to a computer system not using a storage control unit.

It is within the concept of the invention that in certain data processing architectures, a storage control unit might not be employed and that the intelligence or functions of said storage control unit would reside within the central processing unit. Referring to FIG. 4, it is within the concept of the invention that the disc cache 16 could communicate directly with central processing unit 36 along a suitable data control bus 13 via cache CTL interface 78. In this embodiment, central processing unit 36 contains suitable intelligence so as to permit communication directly with disc cache 16 through input/output bus 13. Disc cache 16 thereafter communicates with disc controller 20 and disc drives 14 through control input/output bus 15.

Thus, in its most general embodiment, the disc cache is an intelligent, disc type specific, high speed memory interposed within the input/output subsystem architecture permitting under certain circumstances the retrieval of information from the input/output subsystem at a higher speed not otherwise achievable by the prior art.

2. Disc Cache Hardware

The disc cache subsystem as disclosed herein is an apparatus combining hardware and software techniques to achieve the desired objects as detailed above. The particular implementation of the apparatus (in this case the hardware) can take many forms, but an embodiment of disc cache 16 of FIG. 2 that has been found to be suitable is set forth in FIG. 5. It can be seen that that the major hardware components of the disc cache subsystem consist of the following: interface control logic 48, disc cache, disc cache control microprocessor 50, load/monitor microprocessor 52, and the cache memory 54.

Figure 6:
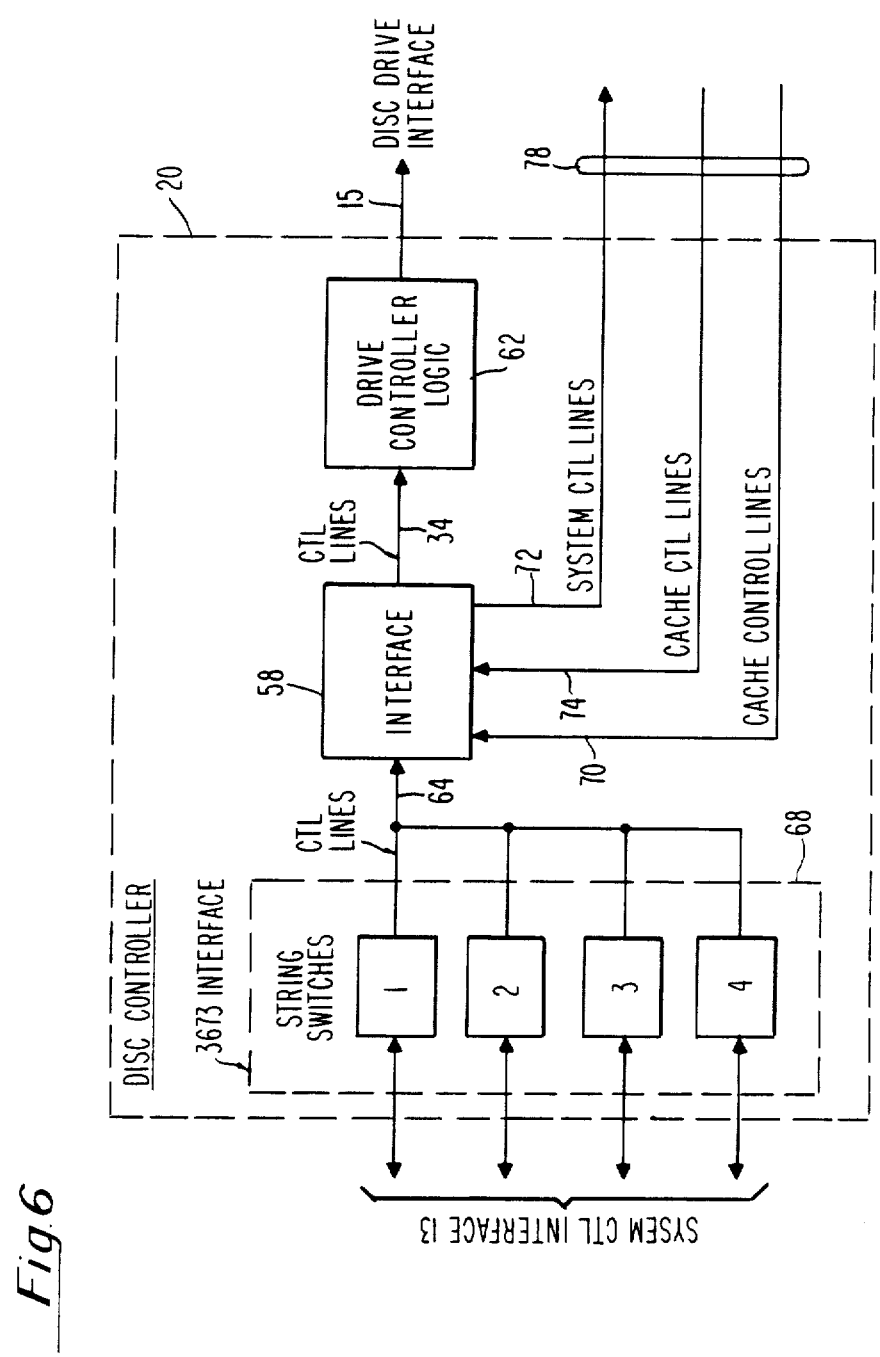
FIG. 6 is a schematic representation of the interface of the disc cache to the disc controller.

The first major hardware component is interface 48 between disc cache control microprocessor 50 and disc controller 20. The cache CTL interface serves the function of providing a means for attachment of the disc cache subsystem to the disc controller as shown in FIG. 6. This controller can be of a type such as the Memorex 3673 disc storage controller which generally is defined in Memorex Publication 3673.21-03. As shown in FIG. 6, disc controller 20 has been modified to permit the attachment of the disc cache 16 by the addition of interface 58 within the CTL interface of the disc controller. Note that interface 58 is positioned between the system CTL interface 13 after string switch 68 and before drive controller logic 62. CTL lines 64 connect string switches 68 with cache interface 58, and CTL lines 34 connect the drive controller logic 62 with cache interface 58. In the particular embodiment being described, it is necessary that the Memorex 3673 disc controller have installed the string switch 68 as described in Memorex Publication 3673.21-03. Cache interface 58 provides data buses and control lines required by the CTL interface. Cache control lines 70 permit the disc cache subsystem to exert control over the string switch interface resident within the disc controller. Full access to the CTL interfaces is provided into the disc cache by System CTL lines 72 and from the disc cache by cache CTL lines 74.

The second main hardware component of the disc cache 16 is the disc cache control microprocessor 50 of FIG. 5 (shown in greater detail in FIG. 7b). In a particular embodiment, it has been found suitable to use a high speed bit slice microprocessor capable of 4,000,000 instructions per second as the microprocessor 76 of FIG. 7b. For this particular embodiment, it has been found suitable to employ a custom microprocessor developed from the Advanced Micro Devices 2900 family of LSI processor chips. However, many other processor designs are possible within the concept of the disc cache subsystem invention that would be capable of handling the disc cache tasks. The basic tasks of the disc cache control microprocessor 50 are: (1) respond to control and data transfer commands from the cache CTL interface 78 of FIG. 6, (2) maintain a directory of data available presently within the cache memory 54 of FIGS. 5 and 7b (described below), (3) control and fill the cache memory 54 with the disc drive data most likely to be required (described below), (4) perform error detection and recovery procedures, and (5) communicate performance data to load/monitor microprocessor 52.

The third major hardware component of a suitable embodiment of the disc cache subsystem is the load/monitor microprocessor 52 of FIG. 5. For the load/monitor microprocessor 52, it has been found suitable to employ an Intel 8080A microprocessor. The Intel 8080A is a complete 8-bit parallel central processing unit that operates at 2 million cycles per second. There are substitute microprocessors commercially available which might be alternatively employed in lieu of the Intel microprocessor. The basic tasks of the load/monitor microprocessor 52 are: (1) control loading of control memory information from flexible disc drive 84 (described below), and (2) perform performance monitoring tasks for the disc cache subsystem.

The last major hardware component of the disc cache subsystem as displayed in FIG. 5 is the cache memory 54. In a suitable embodiment of the disc cache the cache memory 54 is composed of two levels of semi-conductor memory. The first level of semi-conductor memory is the full track buffer 86 shown in FIG. 7b. While it is not mandated by the concept of the invention that two levels of semi-conductor memory comprise cache memory 54 and while it is likewise not mandated by the conception of the invention that the unit of information to be stored by disc cache 16 be a full track of disc drive data, it has been found convenient to configure the hardware of the disc cache as such. Thus, the first level of semi-conductor memory, the full track buffer 86, contains at least one full track of disc drive data and may be constructed from a variety of static or dynamic random access memory chips. It has been found suitable that said full track buffer 86 be constructed from Intel 2147 or Intel 2117 integrated circuits The second level of cache memory 54 has been configured of lower speed devices, and charge coupled devices (CCD's) have been successfully employed for the said lower speed level of cache memory 54. In the particular embodiment, up to 12 megabytes of charge coupled devices have been employed in a configuration using Fairchild F464 charge coupled devices (each device can store a maximum of 64,000 bits of information). In actuality, the cache memory 54 is actually two levels of a three-memory hierarchy of the disc cache subsystem wherein the first level of storage is the disc storage devices 14 and the subsequent two levels of memory are the semiconductor memories as hereinabove described. As will be described below, the function of the cache memory 54 is to store disc drive data in conformance with an algorithm which stores disc drive data most likely to be required by the computer system (more specifically described below).

Figure 7A:
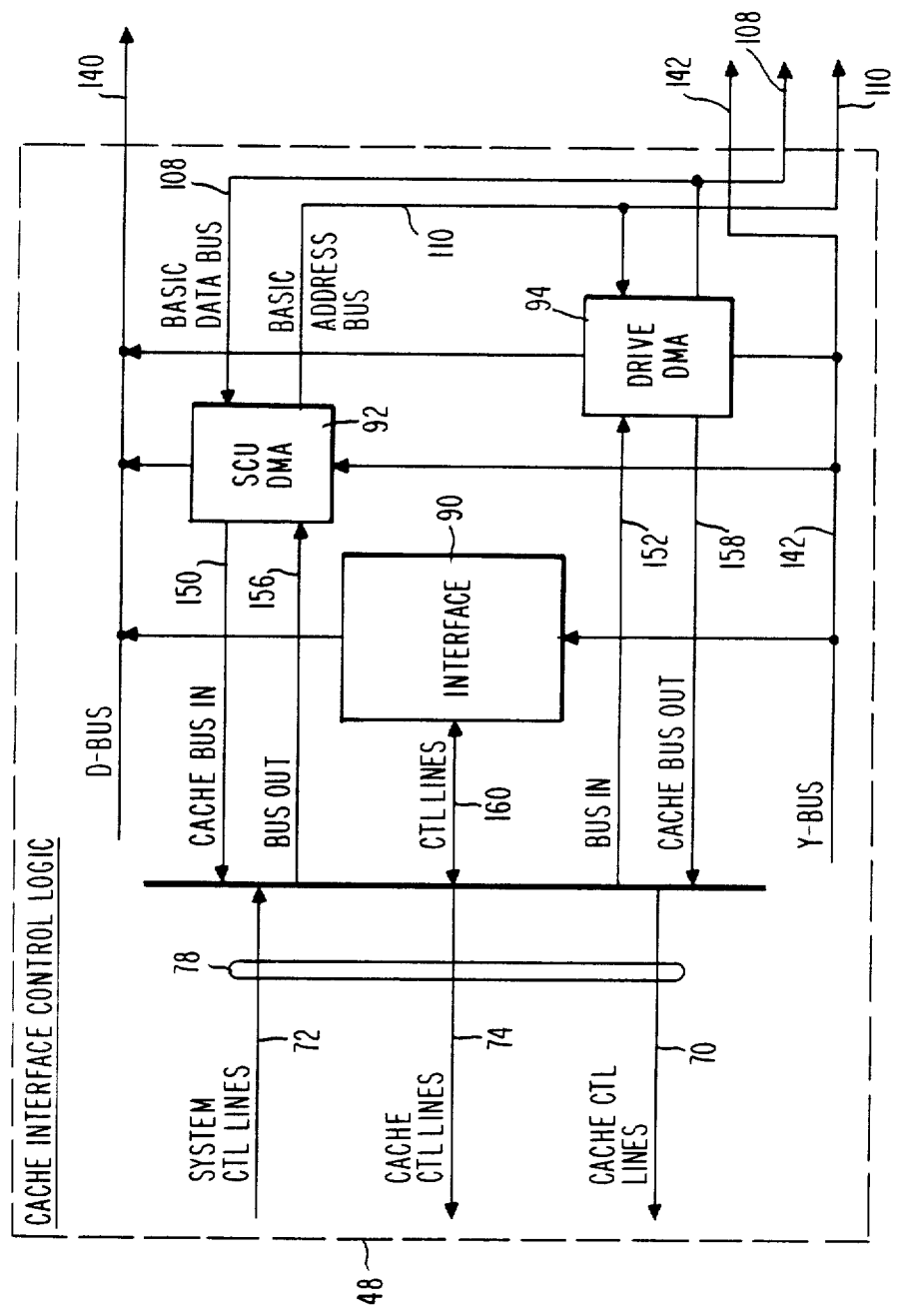
FIG. 7a is a schematic representation of of the disc cache interface control logic.

By referring to FIGS. 7a and 7b, a more detailed definition of the major hardware components of disc cache 16 can be seen. In order to understand the description as shown in FIGS. 7a and 7b, the following definitions are helpful:

| | |
|---|---|
| Interface 90 | Two interface control printed circuit boards containing logic for generation of data buses and control signals for the cache CTL Interface 78. |
| Storage Control Unit Direct Memory Access 92 | A typical DMA ("Direct Memory Access") port that contains memory request logic and address and word counters for control of data transfers between the cache memory 54 and storage control unit 18. |
| Drive Direct Memory Access 94 | A typical DMA ("Direct Memory Access") port that contains memory request logic and address and word countets to control data transfers between the cache memory 54 and disc drives 14. |
| Cache Control Microprocessor 76 | A four million instruction per second bit slice microprocessor utilizing AMD 2900 family of LSI processor chips. |
| Load/Monitor Microprocessor 82 | A microprocessor with the Intel 8080A single chip CPU as its basic component. It runs at 2 MHZ and has 2K × 8 EProm for control memory. |
| Scratch Pad 96 | 8K × 16 of static RAM memory for support of cache control microprocessor 76. |
| Scratch Pad 98 | Two 16 byte × 8 FIFO (First In First Out) cache control microprocessor memories utilized as data buffers for communication with load/monitor microprocessor 82. |
| Writable Control Store 100 | 4K × 40 bits of Intel 2147 static RAM memory utilized as the control memory of cache control microprocessor 76. |
| Online Register 102 | A control register whose bits are set by the Online switches from the operator's panel 104. Cache control microprocessor 76 monitors this register to determine what drives should be cached. |
| Operator's Panel 104 | Contains power on and cache enable switches for each drive. |
| Flexible Disc Drive 84 | A flexible disc drive used for microprogram load. May be of standard Memorex 550-type. |
| Error Correction Code 106 (ECC) | Error detection and correction Logic, ("Hamming Scheme") used for single bit error correction and double bit error detection. |
| Full Track Buffer 86 | 4K × 40 bits (including ECC) of static RAM memory using Intel 2147 chips. |
| Charge Coupled Device Memory 88 | 1 to 12 megabytes of CCD memory using the Fairchild CCD. |
| Basic Data Bus 108 | Bi-directional data bus for data transfers between SCU or Drive DMA ports and full track buffer 86. |
| Basic Address Bus 110 | Tri-stated memory address supplied to full track buffer 86 from SCU DMA 92 or drive DMA 94. |
| C - Bus 138 | Bi-directional data bus for data transfers between full track buffer 86. and CCD memory 88. |
| C - Bus 140 | Tri-stated source bus for all external ports available to cache control microprocessor 76. |
| Y - Bus 142 | Tri-stated destination bus for all external ports available to cache control microprocessor 76. |
| B - Bus 144 | Tri-stated data bus used to |

| | -continued |
|---|---|
| | access ECC logic 106 by full track buffer 86. |
| Memory Address Bus 148 | Memory address bus used by cache control microprocessor 76 to address writable control store 100. |
| Pipeline Bus 150 | Pipeline instruction bus by which cache control microprocessor 76 obtains its microinstructions from writable control store 100 and communicates with scratch pad 98. |
| Cache Bus-In 150 | 8 Bit "bus-In" Data Bus; this is the System CTL lines 72 data "bus-in" for data transfers from cache to the system SCU. |
| Bus-In 152 | 8 bit "bus-In" data bus; this is cache CTL lines 74 data "bus-In" used for data transfer from the disc drives to the cache memory. |
| Bus-Out 156 | 8 Bit "bus-put", the System CTL lines 72 "bus-out" used for data transfers and control command data from the system SCU 18 to the disc cache 16 |
| Cache Bus-Out 158 | 8 Bit "bus-out", the Cache CTL lines 74 bus-out used for data and control commands when the disc cache 16 controls the disc drives 14. |
| CTL Lines 160 | CTL Interface control lines generated in the interface 90 logic. |
| Cache Control Lines 70 | A set of control signals generated in interface logic by cache control microprocessor 76 to control switching of the multiplexers of interface 58 of FIG. 6 to select the desired interface communication path. |
| $BC_{1XX}$ | All lines shown in FIG. 7b with the $BC_{1XX}$ are to indicate that a bus or control communication path does exist but it is not explicitly defined herein. |

Figure 3:
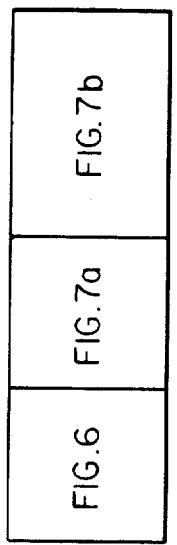
FIG. 3 is a diagram showing the assembly of FIGS. 6, 7a and 7b.

To more fully explain the invention, FIGS. 6, 7a and 7b should be oriented as shown in FIG. 3.

Referring to FIGS. 7a and 7b, microprocessor 76 is the controlling component of disc cache 16. Microprocessor 76 receives all external data via tri-stated 16 bit data bus 140 and writes to all external ports via 16 bit tri-stated output data bus 142. As described above, one of the basic functions of the disc cache subsystem is to respond to data transfer and control commands received from the system storage control unit 18 of FIG. 2 via cache CTL interface 78. The cache control microprocessor 50 monitors the system commands received from interface control logic 48 in turn from the cache CTL interface 78. Cache control microprocessor 50 responds to commands by setting the proper response in control registers in interface control logic 48. These commands are then gated to the cache CTL interface 78 as required by the CTL interface specifications as defined in the prior art.

Microprocessor 76 receivs its micro instructions from writable control store 100 along pipeline bus 148. Microprocessor 76 addresses writable control store 100 via memory address bus 146. Scratch pad 96 is primarily used by microprocessor 76 to store a listing of disc drive track addresses that currently reside in cache memory 54. The track list addresses as stored in scratch pad 96 can be searched and dynamically updated by microprocessor 76 as data in cache memory 54 is accessed.

Microprocessor 76 uses D-bus 140 and Y-bus 142 to access scratch pad 96. In addition, other relevant disc cache control data is stored in scratch pad 96 as defined by the disc cache microprogram (described below). Microprocessor 76 also integrates the information in online register 102 determining which disc drives 14 on the string are subject to "caching". The storage control unit direct memory access 92 and drive direct memory access 94 are used for data transfers between the full track buffer 86 and the system storage control unit 18 and disc drives 14 respectively. The direct memory access ports are programmed and monitored via D-bus 140 and Y-bus 142 by microprocessor 76.

Full track buffer 86 is addressed via the basic address bus 110 and its contents are transferred to or from either direct memory access port via basic data bus 108.

Full track buffer 86 and CCD memory 88 share common error detection and correction logic 106. Data transfers between full track buffer 86 and CCD memory 88 are of what is known in the art as a direct memory access-type of operation via bi-directional C-bus 183 controlled by microprocessor 76. In addition, cache control microprocessor 50 programs the direct memory access logic included within the charge coupled device memory via Y-bus 142.

3. Disc Cache Operational Hardware Modes

Figure 8:
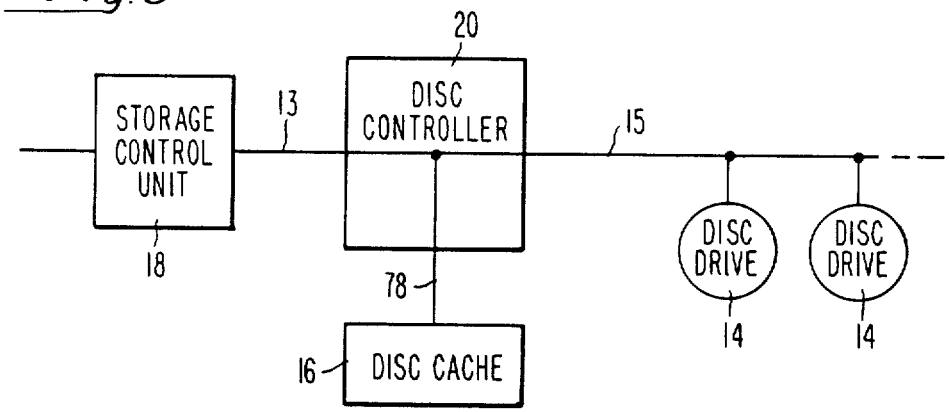
FIG. 8 is a simplified hardware configuration for the disc cache.

While it is possible to practice the concept of the disc cache invention in many configurations, a configuration which has been found to be particularly suitable is that which is compatible with IBM subsystem channel/control unit/device architecture well known in the prior art. Referring to FIG. 8, storage control unit 18 connects to disc controller 20 via system CTL interface 13. Disc controller 20 connects to disc cache 16 via cache CTL interface 78. Disc controller 20 connects to disc drives 14 via interface 15. It is something of a simplification to show interfaces 13, 15, and 78 connected together within disc controller 20 at point 610. In fact, 610 is not a hardwired connection but rather a juncture within the disc controller which will in fact vary depending upon the hardware mode of operation as defined hereinbelow.

Figure 9:
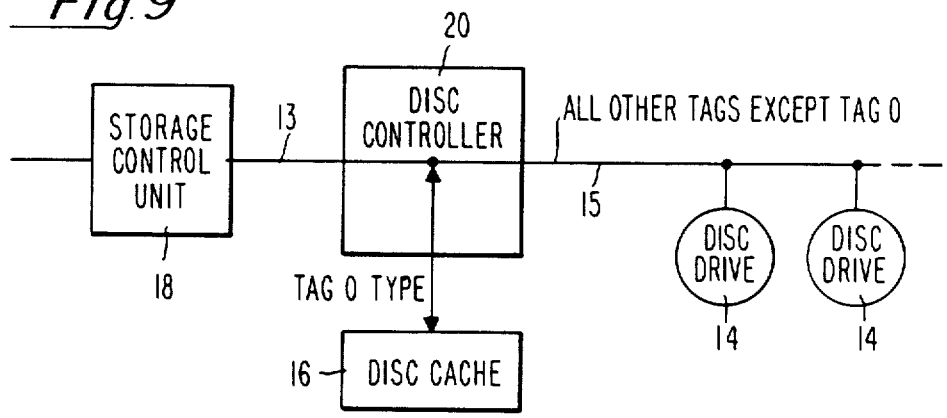
FIG. 9 is a diagram of tag O mode with respect to hardware control.

There are basically four hardware modes of operation for the disc cache 16 as determined by commands from storage control unit 18 in a suitable embodiment to practice the invention. They are as follows:

(1) Tag Zero Mode. When in tag zero mode as shown in FIG. 9, all tag commands *except* tag zero commands (as described herein under subsection heading "Tag Zero Commands"), are transferred between storage control unit 18 through interface 13 to disc controller 20 and onto disc drives 14 through bus 15. For all commands *except* tag zero commands, the disc cache 16 is effectively not present on the string. Tag zero commands, however, are transferred from the storage control unit 18 through interface 13 to disc controller 20, but disc controller 20 routes these commands to disc cache 16 through interface 78. The response to tag zero commands is from disc cache 16 to disc controller 20 and storage control unit 18 through interfaces 78 and 13 respectively. Thus, tag zero mode can be understood as a hardware mode in which all other tag commands except tag zero are routed to disc drives 14, but disc controller 20 routes tag zero commands to disc cache 16 through interface 78. The response to tag zero commands is from disc cache 16 to disc controller 20 and storage control unit 18 through interfaces 78 and 13, respectively. Thus, tag zero mode can be understood as an operational hardware mode in which typical tag commands are handled on the disc subsystem in a manner consistent with the prior art except for the specialized tag zero commands which are routed to the disc cache.

Figure 10:
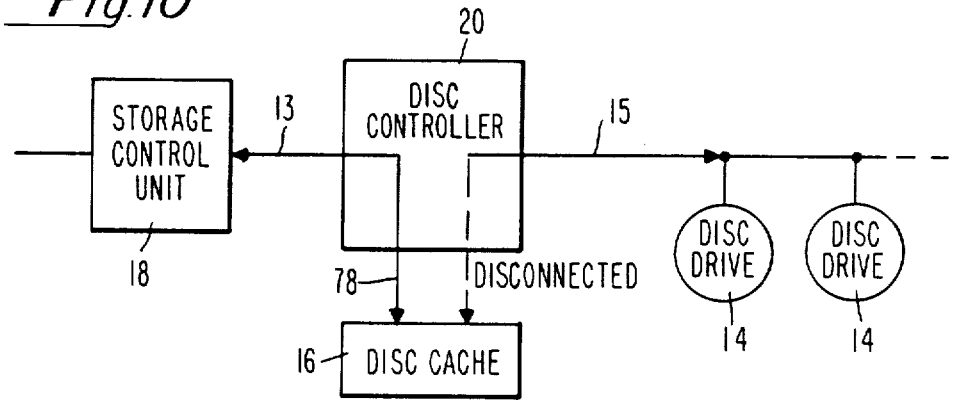
FIG. 10 is a diagram of SCU mode with respect to hardware control.

2. SCU Mode. If the disc cache 16 is in SCU Mode, all tag commands are transferred from the storage control unit 18 (referring to FIG. 10) through interface 13 to disc controller 20 on to disc cache 16 through interface 78. The disc cache 16 is in the "active" state in the microprogram sense (see Software description hereinbelow). In the SCU Mode, no communication is possible between the storage control unit 18 and disc drives 14; this is the primary operational mode for the disc cache 16.

3. Control Mode. If in this hardware mode, disc cache 16 as shown in FIG. 11 communicates directly with disc drive(s) 14 through disc controller 20 through interfaces 78 and 15, respectively. In this mode, storage control unit 18 will receive a "busy" status from disc controller 20 which means that no connection can be attempted between storage control unit 18 and disc controller 20 through interface 13. Disc cache 16 has effectively usurped control of the disc string subsystem and controls its operations.

4. Pass Through Mode. Pass through mode as shown in FIG. 12 is effectively a hardware mode allowing direct communication between the storage control unit 18 and disc drives 14 through disc controller 20 and associated interfaces 13 and 15. During this operational mode, no tag commands are routed to the disc cache 16 through interface 78. The disc cache is effectively disconnected from the disc storage string subsystem and the subsystem behaves as if no disc cache 16 were connected.

The hardware operational modes as hereinabove described work integrally and are under the control of the subsystem microprogram resident in cache control microprocessor 50. As described below in the section entitled "Disc Cache Subsystem Software", it is the initiation by storage control unit 18 of appropriate tag zero commands which catalyzes the microprogram to change microprogram state (defined below) to effect changes in hardware operational modes of the subsystem.

4. Disc Cache Subsystem Software

Figure 13:
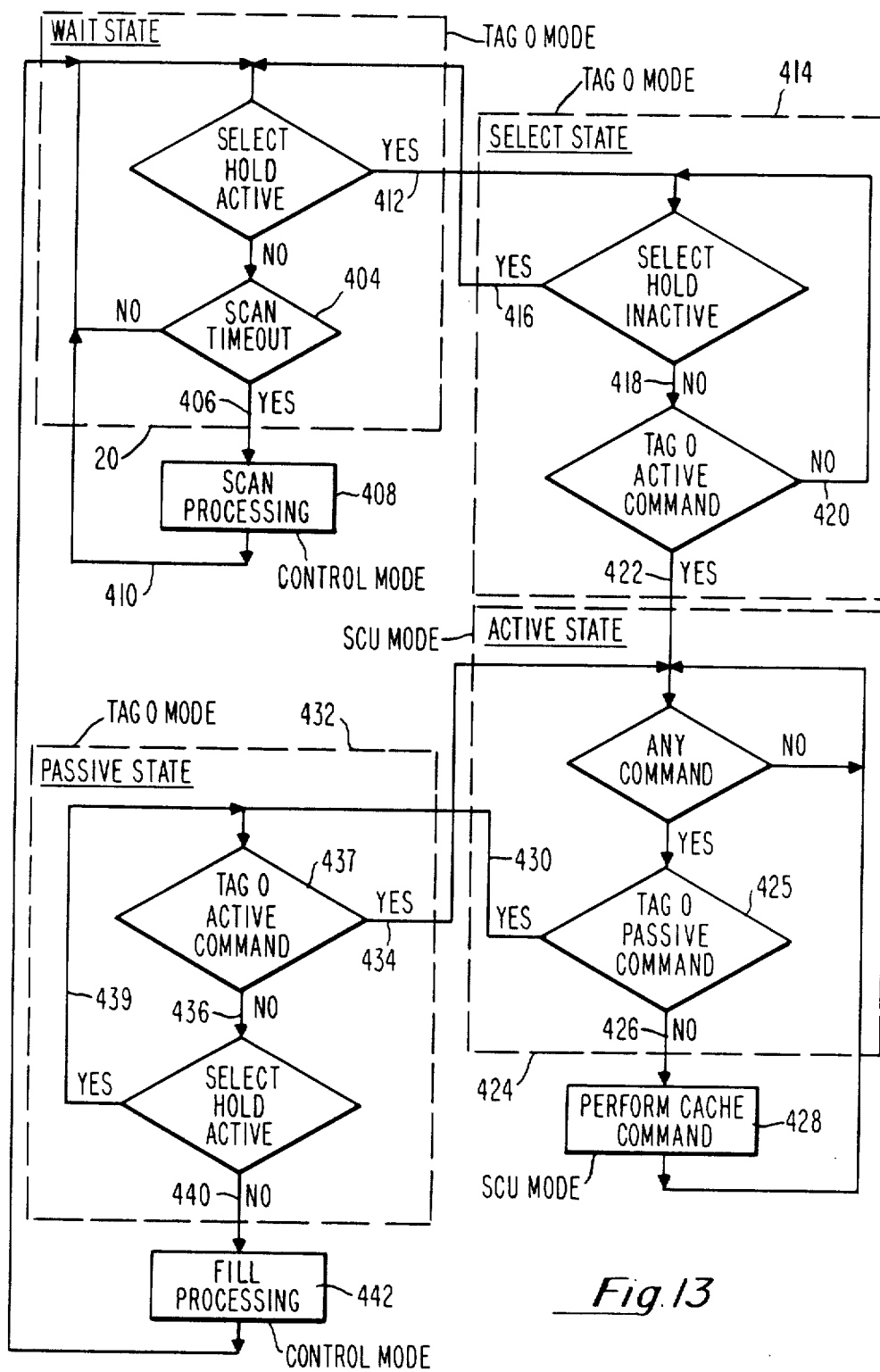
FIG. 13 is a microprogram flow diagram of the disc cache.

The concept of the disc cache invention can be practiced in many different ways. In a particularly suitable embodiment, the hardware as described hereinabove works in conjunction with a microprogram that is loaded through flexible disc drive 84 into writable control store 100 that is addressed by microprocessor 76. In the sense of the microprogram for a suitable embodiment of the invention, the microprogram employs four "states" which describe software conditions of the device with respect to its desired functions. A "state" can be understood as a condition of the microprogram which remains static unless changed and/or altered by external input. Referring to FIG. 13, there are four microprogram states in the preferred embodiment: (1) wait state 400, (2) select state 414, (3) active state 424, and (4) passive state 432.

In wait state 400, the disc cache as well as the entire disc subsystem is in a "quiet" condition as evidenced by the system CTL interface 13 between the storage control unit 18 and disc controller 20 being quiescent; there are no signals on system CTL interface 13 of FIG. 6. As shown in FIG. 13, wait state 400 can be understood as an infinite programming loop that begins with the condition of the select hold line of CTL interface 78. If the select hold line is low (i.e., a "no" condition 402), the microprogram will begin to time for a "scan timeout" 404. If the disc cache subsystem remains in its quiet condition so that a scan timeout is achieved (i.e., "yes" 406), then the disc cache subsystem will enter a scan processing 408 mode in which internal "housekeeping" functions for the disc cache are performed. Upon completion of the scan processing 410, the microprogram returns to the wait state 400 and again monitors the condition of select hold on system CTL interface 13 in FIG. 6. Scan processing 408 is not a "state" which the microprogram enters in a "stable" condition. That is, scan processing 408 is merely a function through which the programming always flows to an end condition and returns to the wait state 400. Scan processing is a function of the microcode which is analogous to hardware "control mode" as defined in hereinabove while wait state 400 can be understood as a hardware tag zero mode.

If the select hold line goes "high" (yes 412) during the wait state, then the disc cache microprogram enters the "select" state 414. The "select" state 414 is defined as a condition wherein the select hold line is "high"; the storage control unit has notified all strings of drives connected thereto of an impending selection of one of the strings. At all times during the select state 414, the condition of the select hold line is monitored. If the select hold line goes "low", then select hold is inactive and a yes 416 condition as shown in FIG. 13 will return the disc cache microprogram to the wait state 400. If the select hold line remains "high" (i.e., not inactive 418), then the microprogram monitors for a tag zero command upon cache CTL Interface 78 of FIG. 6. If a tag zero "active" command is not received (reference 420), the microprogram stops in "select" state unless "select" hold goes "inactive" (i.e., "low" 416) in which case the microprogram returns to the wait state 400. If a tag zero active command is received (reference yes 422), then the microprogram will enter the "active" state 424. As is the case for wait state 400, select state 414 is also a hardware tag zero mode.

The "active" state 424 is defined as a condition of the microprogram in which the storage control unit 18 has already selected a specific drive controller 20 and if the disc cache 16 is attached to said drive controller 20 and disc string subsystem, then a tag zero "active" command will "activate" the disc cache microprogram. In the "active" state 424, the disc cache intercepts and/or receives all instructions emanating from the storage control unit 18 and therewithin data processing operations take place. This could also be called "caching" state and can be understood as the main cache operational state. In the hardware sense, this is "SCU mode" as described hereinabove. If, during the "active" state 424, the tag zero "passive" command 425 is *not* received by the disc cache microprogram (reference 426), then the disc cache will perform disc caching commands 428. The performance of disc caching commands 428 as shown in FIG. 13 is not a "state" but more properly a condition of the microprogram through which functions are performed and, upon completion, the microprogram returns to the "active" state 424. The performance of cache commands can be thought of as "SCU mode" in the hardware sense. If, during the "active" state 424, a tag zero "passive" command is received (reference 430 in FIG. 13), the microprogram will enter the "passive" state 432.

The "passive" state 432 is defined as a microprogram condition in which the storage control unit 18 communicates directly with the disc storage devices 14. Notice that this is in distinction to the "active" state 424 in which the disc cache receives all instructions and there is *no* communication between the storage control unit 18 and the disc storage devices 14 directly. Prior to the initiation of the "passive" state 432, the storage control unit 18 has originated a tag zero command of specific decode to "drop" the disc cache microprogram into a "passive" state allowing communication between the storage control unit 18 and the disc drives directly (this is the tag zero "passive" command 430) In the "passive" state 432, the disc cache 16 is continually monitoring tag zero commands (i.e., hardware tag zero mode). If a tag zero "active" command is received as shown by yes 434 in FIG. 13, the disc cache 16 will return to the "active" state 424. If a tag zero "active" command 437 is not received during the "passive" state (reference 436), the condition of the select hold line as hereinabove described is monitored. If a select hold goes "active" (yes 439) during the "passive" state, the disc cache microprogram becomes poised for receipt of a tag zero "active" command. If in fact a tag zero "active" command is received (i.e., yes 434), then the disc cache 16 will return to the "active" state 424. If the select hold line goes "low" (i.e., no 440) then the disc cache will proceed with fill procesing 442.

While passive state 432 is a hardware tag zero mode as described hereinabove, fill processing 442 is a hardware control mode. During fill processing 442, the disc cache 16 takes control of the string of disc storage devices and fills into the full track buffer 86 information which at this point may only reside upon the magnetic discs 14. During fill processing 442, a full track of information will be transferred from the disc storage devices 14 to the full track buffer 86. Appropriately, since the track to be transferred to the full track buffer 86 is the one most recently requested, said track will receive the status of the most recently used track in the storage management tables residing in scratch pad memory 96 of FIG. 7b. Moreover, this track table entry will be adjusted in said memory to accommodate the track loaded into the full track buffer 86 with respect to disc device number, cylinder location, and head address. Upon the completion of fill processing 442 (which is not a "state"), the microprogram will return to the wait state 400 and again monitor the status of the select hold line. In a "hardware" sense, the initiation of fill processing 442 causes the disc cache to take "control" of the disc string subsystem. During fill processing 442, the storage control unit 18 may not communicate with the disc string, and a "string busy" condition exists to the storage control units attached to the string.

It can thus be understood that the hardware and microprogram of the disc cache subsystem can integrally respond as follows in a typical situation Time $T_0$: A select hold "active" is received from the storage control unit 18 by disc cache 16.

Time $T_1$: A tag zero command is received from storage control unit 18.

Time $T_2$: Cache microprogram changes state (if required).

Time $T_3$: Cache requests hardware to change mode.

Time $T_4$: Function is performed (microprogram is in new state *and* hardware is in new mode).

Time $T_5$: Process proceeds as required as shown in FIG. 13.

While a suitable embodiment to practice the invention of the disc cache subsystem includes error recovery and other programming embellishments to enhance operation a suitable logical configuration for the microprogram is as hereinabove described and shown in FIG. 13.

5. Storage Management

The disc cache subsystem uses tables which generally reside within scratch pad 96 of FIG. 7b for management of cache storage. While within the concept of the invention, many implementations for achieving the objects are possible, a particular scheme of storage management within the preferred disc cache embodiment has been found to be suitable. While generally data modules residing within the cache memory 54 can be based upon discreet units of information of any size, in the preferred embodiment CCD storage 88 contains full tracks of information, which in the case of the Memorex 3670 and 3675 disc storage devices amounts to 13,030 bytes of information. Each of the data tracks are loaded from the disc drives 14. Each track of data that is stored within charge coupled device memory 88 and full track buffer 86 has corresponding entries in the tables available to the microprocessor 76 created by the necessity for management of the data.

The disc cache scratch pad 96 maintains three types of storage management tables: the dynamic table, the track lock table, and the list of empty storage. The dynamic table is continuously updated based upon cache memory 54 usage criteria. An LRU Algorithm as known in the art has been successfully employed for this purpose. The track lock table contains parameters for that portion of the CCD memory 88 which is "locked" into cache memory 54. Within the meaning of this invention, "locking" a track into the cache means that a data track is not replaced based upon an algorithm as is the case with the dynamic table (i.e., it is permanently in cache memory 54). The list of empty storage is a table which keeps track of available space within CCD memory 88; the contents of the table listing empty storage is that storage currently not being used and consequently available to be filled with data from the disc drives 14.

Every data track stored within cache memory 54 has corresponding entries within the dynamic table wherein each entry consists of a plurality of parameters or items. Two parameters link the table together based upon the most recent usage and least recent usage of the tracks listed therein respectively. Every time a data track is requested from the cache memory 54, the item related to this track is put on the top of the list (i.e., most recently used) and the item on the bottom of the list becomes the least recently used. Other parameters contain information relating to the disc tracks to specific cylinder addresses, head addresses and device addresses in the disc storage devices 14 from whence they came. Taken together, address pointers link together by known linking techniques items of the dynamic table which allows updating of the table based on track usage.

If the cache memory 54 is filled and another data track is required to be filled from the disc storage devices 14 into the cache memory 54, the least recently used data track on the bottom of the table will be dropped from the table and the new data track just filled from the disc storage devices 14 will be put on the top of the table becoming the most recently used data track. This algorithm is well known in the prior art and guarantees that the most recently used tracks are in the cache storage while data tracks with low activity are dropped from cache memory 54.

The dynamic table also contains a second set of link pointers which link together data tracks filled from a particular disc storage device, i.e., with the same disc storage device address. These tables are also updated when most recently used/least recently used linkage information is updated. In this manner, searching the cache memory 54 for a particular track can be shortened as it is always known that the storage control unit's fetch for a particular track will specify the particular disc storage device. Thus, it is considerably shorter to search a table of most recently used/least recently used tracks if said table is linked by specific disc storage device. Naturally, if only one disc storage device is being cached at any given time, then the entire contents of cache memory 54 will have to be searched, but if more than one disc drive is cached, then significant economies of searching can be realized.

6. Tag Zero Commands

The standard achitecture of the IBM compatible disc storage device subsystem utilizes certain commands known as "tag" command whereby the storage control unit 18 communicates with the drive controller 20 on the system CTL interface 13. For a complete definition of the system CTL interface and tag commands as well as a definition of bus-in and bus-out lines, see Memorex 3673/3675/3670 Disc Storage Subsystem Theory of Operations (Publication 3673.21-02). However, it is not possible within the standard architecture for the storage control unit to activate and control a disc storage subsystem where said subsystem includes a disc cache 16; it is necessary in order to employ the concept of the disc cache invention to generate or utilize a special tag command which will activate the disc cache 16 logic and permit caching operations to proceed as herein described. Any number of tag commands could be so employed with the only requirement being that a tag command so chosen as the specific command which is intended to activate the disc cache not be ambiguous and confused with other tag commands that are decoded to have different meanings within the architecture of the disc I/O subsystem. In a particular embodiment, it has been found suitable to employ tag decode 00 (hex) with variable values on bus-out as that tag command which will initiate cache functions. When a tag zero command is received by the disc cache 16 from the storage control unit 18, the disc cache may take control of the disc subsystem and perform whatever operations are required as hereinabove described. Within the definition of the Input/Output subsystem that is IBM channel-compatible, tag decode 00 is an unused CTL tag out bus (tag bits 0, 3, 4, 5, 6, and 7, all equal zero) which is used in conjunction with the CTL bus out lines.

VARIABLE DATA RATE

Because of the disc cache subsystem architecture as hereinabove described and generally shown in FIG. 2, it is possible to obtain a beneficial effect that can be called variable data rate. Variable data rate allows the channel to transfer data at its own data rate rather than being limited as in the prior art to a data rate established for transfer between disc storage devices and the control unit dependent upon the rotational rate of disc storage devices. In a suitable embodiment of the disc cache 16 invention, when a full track of information is stored within full track buffer 86 of FIG. 7b and said information is desired by the central processing unit, the data transfer rate between the disc cache subsystem and the channel need *not* be at a constant data rate and is *not* controlled by the data transfer rate of the rotating media. As the data transfer rate of the cache CTL interface 78 is not required to be constant, the transfer rate of the channel is the controlling factor.

Figure 14:
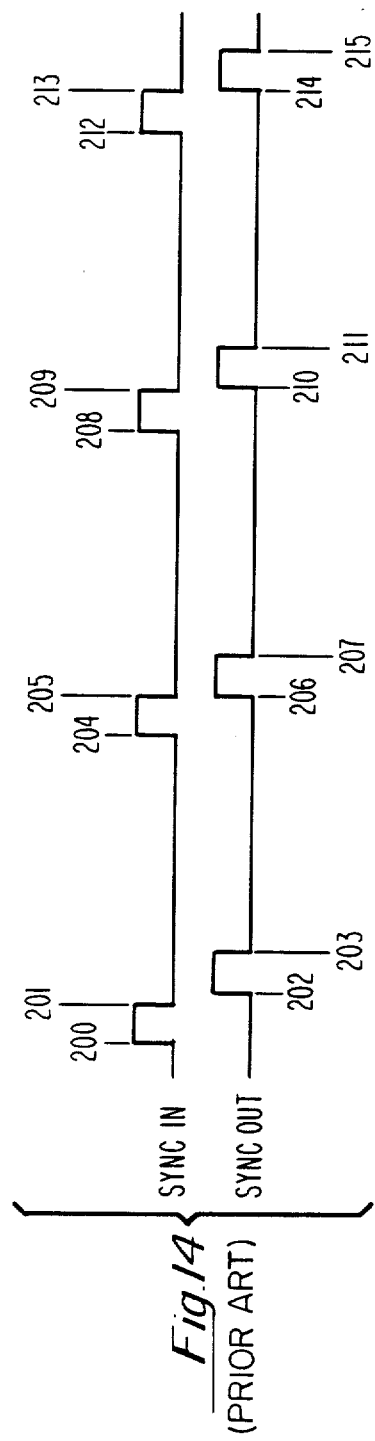
FIG. 14 is a pulse train diagram of the SYNC IN/SYNC OUT pulses for the prior art.

In order to understand the concept of the variable data rate aspect of the disc cache 16 invention, it is necessary to first understand the limitations of the prior art. Referring to FIG. 14, SYNC IN and SYNC OUT lines of a prior art data transfer are displayed. The basic timing relationship is defined by the time between edges 200 and 204, 204 and 208, and 208 and 212. The time between those pulses is equal and controlled by clocking pulses defined directly by servo encoded information on the rotating disc memory. The time between edges 200 and 201, 204 and 205, 208 and 209, and 212 and 213 is controlled by hardware within the disc string controller 12 of FIG. 1. The time relationship between the leading edge of SYNC IN pulses (references 200, 204, 208 and 212) and the leading edge of SYNC OUT pulses (references 202, 206, 210 and 214), and the time relationship between the trailing edge of SYNC IN pulses (references 201, 205, 209 and 213) and the trailing edge of SYNC OUT pulses (references 203, 207, 211 and 215) is controlled by CTL cable delays and hardware delays within storage control unit 10. The time between the leading and trailing edges of the SYNC OUT pulses (time between 202 and 203, 206 and 207, 210 and 211, and 214 and 215) is controlled by storage control unit 10 hardware and its delayed recognition of SYNC IN.

Figure 15:
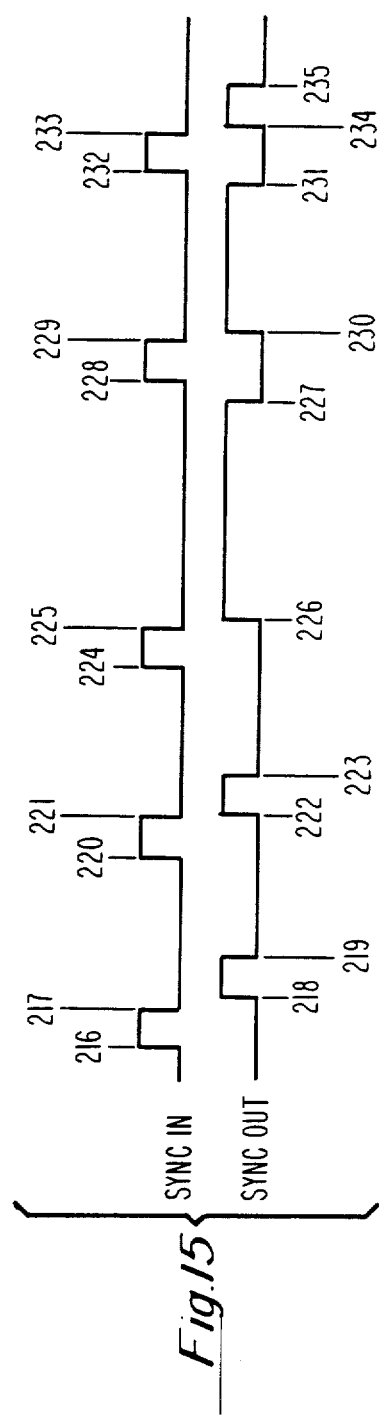
FIG. 15 is a pulse train diagram of the SYNC IN/SYNC OUT pulses for the variable data rate feature of the disc cache.

Implementation of the variable data rate concept produces a pulse sequence significantly different from the prior art SYNC IN/SYNC OUT relationship. Using the variable data rate concept, the leading edge of SYNC IN pulses will not bear a repetitive temporal relationship with respect to the SYNC OUT pulses. Referring to FIG. 15, the time between points 216 and 220 and between 220 and 224 is controlled by the hardware transfer rate of the disc cache 16 and control electronics and *not* controlled by the rotational rate of the disc storage devices. Notice that the time between edges 216 and 220, and between 220 and 224 is less than that shown in FIG. 14 between edges 200 and 204, 204 and 208, and 208 and 212, the prior art train of SYNC IN pulses. That is, the transfer rate under the variable data rate embodiment is higher than that of the prior art because the transfer rate is controlled by the electronics of the disc cache 16 and *not* rotating mechanical components.

The time between edges 224 and 228 and between 228 and 232 is controlled by a monitoring by the control electronics of the trailing edge of SYNC OUT. It is the recognition of edges 227 and 231 of the SYNC OUT trail of pulses that controls the temporal relationship between edges 224 and 228, and between 228 and 232. Edges 228 and 232 of the SYNC IN pulses can only occur *after* recognition of the trailing edges 227 and 231 of the SYNC OUT pulses. Trailing edges 227 and 231 of the SYNC OUT pulses are shown significantly delayed from leading edges 226 and 230, respectively, because they are delayed by the storage control unit hardware whenever the internal storage control unit data buffers are unavailable for further CTL data transfer. The internal storage control unit data buffers become unavailable when the CTL data transfer rate exceeds the channel data transfer rate. Therefore, in the variable data rate embodiment of the disc cache subsystem invention, the time between the leading edge 226 and trailing edge 227 and the time between the leading edge 230 and trailing edge 231 of the SYNC OUT pulses includes the time needed so that the channel data transfer rate will meet or exceed the CTL data transfer rate. Thus, there is a "synchronizing" of CTL data transfer rates and channel transfer rates. The data transfer rate is "variable". the time between edges 224 and 228, and between edges 228 and 232, therefore, consists of delays caused by subsystem hardware, the CTL cable including line drivers and receivers, and the disc cache 16 memory and control electronics. As is the case with the prior art system, the time between the leading edge of SYNC IN pulses and the leading edge of the SYNC OUT pulses (that is, between points 216 and 218, 220 and 222, 224 and 226, 228 and 230, and 232 and 234) consists of CTL cable delays and storage control unit hardware delays (that is, line drivers and receivers).

As is the case in the prior art, SYNC IN/SYNC OUT temporal relationship, the time between edges 217 and 219, 221 and 223, and between 233 and 235 is similarly comprised of CTL cable delays, storage control unit hardware delays to monitor the availability of internal buffers, and storage, control unit line driver/line receiver delays. What is *not* the case in the prior art and which is an aspect of the variable data rate implementation is the additional delay between edges 225 and 227, and between edges 229 and 231 caused by the delay of the channel to transfer a byte of information (that is, to make an internal storage control unit data buffer available). The time between points 216 and 217, 220 and 221, 224 and 225, 228 and 229, and between 232 and 233 is controlled by the disc cache 16 which is designed to provide well-shaped pulses of sufficient duration.

Thus, it can be seen that the variable data rate embodiment allows data transfer between the disc cache 16 and the channel 8 at a rate which is not otherwise possible in the configuration of the prior art. The data transfer rate is essentially controlled by the data rate of the channel 8.

We claim:

1. For use in a data processing system having a data processor and channel means via which said data processor provides peripheral input-output commands for use in performing peripheral input-output operations, the combination comprising:

peripheral storage means comprising a plurality of relatively slow operating peripheral storage devices; and a peripheral cache subsystem coupled between the outboard side of said channel means and said peripheral storage means for controlling the transfer of data therebetween;

said peripheral cache subsystem comprising:

peripheral cache memory means for storing peripheral data and having a relatively small storage capacity and fast access time relative to said peripheral storage means;

peripheral control means including a directory indicating the corresponding peripheral storage device and location therein of peripheral data stored in said cache memory means, said directly containing link pointers which link stored data based on the peripheral storage devices corresponding thereto;

said peripheral control means providing for transferring data to and from said peripheral storage means and said cache memory means such that said cache memory means stores data likely to be requested by said processor, while also updating said directory including said link pointers to correspond to currently stored data in said cache memory means;

said peripheral control means being operable in response to an input-output command provided by said processor via said channel means which requests data stored in a particular peripheral device to search said cache memory means using said link pointers to limit the search to stored data corresponding to said particular peripheral device, and in response to such search to provide an indication as to whether the requested data is stored in said cache memory means;

said peripheral control means being operable when said indication indicates that the data requested is stored in said cache memory means to access this requested data therefrom for transfer to said processor via said channel means;

said peripheral control means being operative when said indication indicates that the requested data is not stored in said cache memory means for obtaining this requested data by accessing said particular peripheral device.

2. The invention in accordance with claim 1, wherein said devices are disc drives, wherein data is stored on tracks provided on said drives, wherein data from said drives is stored in said cache memory means on a track basis, and wherein said link pointers link together tracks from the same drive.

3. The invention in accordance with claim 1 or 2, wherein said directory also contains additional link pointers which link stored data in said cache memory means based on usage, and wherein said peripheral control means is operable in the event that said cache memory means is unable to accept data to be transferred thereto from said peripheral storage means for causing this transferred data to replace particular data stored in said cache memory means, the particular data to be replaced being determined using said additional link pointers.

4. The invention in accordance with claim 3, wherein said peripheral control means provides for the storage of locking data indicative of stored data in said cache memory means which is not to be replaced, said locking data being employed by said peripheral control means to prevent replacement of the corresponding stored data in said cache memory means.

5. The invention in accordance with claim 1 or 2, wherein said peripheral control means provides for the storage of disc drive caching data indicative of which of said drives is to be subject to caching, said disc drive caching data being employed by said peripheral control means to provide for bypassing said cache memory means for an input-output command directed to a device which is not subject to caching.

6. The invention in accordance with claim 5, including operator controllable means for controlling the contents of said disc drive caching data.

7. The invention in accordance with claim 3 or 2, wherein said processor control means selectively provides for the transfer of stored data from a peripheral storage device to said processor via said channel means without searching said cache memory means, wherein said processor control means provides for indicating when a peripheral storage device should transfer data directly to a requesting processor via said channel means without searching said cache memory means, and wherein said processor control means is operative to transfer data to said processor via said channel means based on this indication.

8. The invention in accordance with claim 1 or 2, wherein said peripheral control means includes string switch means providing for the transfer of peripheral data to an additional processor via a corresponding channel means in a like manner as provided for the first-mentioned processor and channel means.

* * * * *

UNITED STATES PATENT AND TRADEMARK OFFICE
CERTIFICATE OF CORRECTION

PATENT NO. : 4,868,734

DATED : September 19, 1989

INVENTOR(S) : Thomas E. Idleman, et al.

It is certified that error appears in the above-identified patent and that said Letters Patent is hereby corrected as shown below:

Col. 1, line 53 delete "hereto" and insert --thereto--.

Col. 5, line 31, after controller, delete "2" and insert --20--.

Signed and Sealed this

Seventh Day of April, 1992

Attest:

HARRY F. MANBECK, JR.

*Attesting Officer*          *Commissioner of Patents and Trademarks*